3,174,850
GRAIN REFINED BERYLLIUM ALLOY
Jack K. Y. Hum, Berkeley, and Alfred L. Donlevy, San Leandro, Calif., assignors to Stauffer Chemical Company, New York, N.Y., a corporation of Delaware
No Drawing. Filed Sept. 29, 1960, Ser. No. 59,159
2 Claims. (Cl. 75—150)

The present invention is concerned with the element beryllium. In particular it is concerned with novel processes for refining the grain size of the element beryllium, and with the novel products produced by these processes.

The element beryllium is useful as a structural metal in places where lightweight, rigid material having fairly good resistance to high temperature is required, but the use of the material in the past has been hampered because of difficulty in fabricating the material and also because of difficulty in joining pieces of it together. The present invention provides a solution to these problems and makes possible beryllium which has very small grain size, increased ease of fabricability, and the capability of being welded to form a strong weld. Prior to the present invention it was not possible to weld beryllium and form a strong weld because of the brittle character of the welded joint, the so-called welding processes formerly used to produce workable welds being actually joining processes in which aluminum was used to make the bond between the pieces of beryllium.

According to the present invention, boron, in an amount from 0.01 to 0.3 percent by weight of beryllium is added to the beryllium. The boron, in finely divided form, is mixed uniformly with the beryllium, also in a finely divided state. The mixture is then under vacuum and allowed to resolidify. Upon resolidification it is found that the resulting beryllium has a very fine grain size and is much more easily fabricated than conventional beryllium. Furthermore the structural strength of the material and its resistance to high temperatures are not impaired. It should particularly be emphasized that the fine grained beryllium maintains its fine grains even upon repeated meltings and resolidifications, thus making welding possible.

In its commercially available form beryllium metal is characterized by a fairly high percentage of oxygen which is present as an impurity. Typical oxygen content of commercial beryllium metal will be found to vary from about 2 to about 3 percent. To carry out the present invention this oxygen should be removed. The removal of the oxygen from the beryllium may best be accomplished by treatment wth aluminum. Aluminum, preferably in the form of finely divided metal, is intimately mixed with the beryllium, also preferably in a finely divided form. The mixture is subjected to melting and the aluminum acts to remove the oxygen by combining with it to form oxide. The amount of aluminum to be used in each particular instance may readily be calculated on the basis of a conventional analysis of the oxygen content of the particular beryllium sample. The stoichiometric amount of aluminum or a slight excess should be employed. For greatest possible convenience, the addition of aluminum and of boron may both be carried out simultaneously.

The amount of boron required varies between 0.01 percent and 0.3 percent. When less than this amount is employed, the desirable results are not observed. When, on the other hand, too large an amount of boron is used, undesirable intermetallic compounds are formed. The optimum amount of boron is approximately 0.1 percent.

The boron is preferably added in the form of the free element. Either crystalline boron or amorphous boron may be used. Crystalline boron sometimes gives slightly better results, perhaps because less of it is lost during the melting process than is the case with amorphous boron, although this explanation is not certain.

In the preferred method of carrying out the present invention the beryllium powder, the boron powder and aluminum powder are blended together intimately and the mixture is pressed into the form of a bar. The bar is then subjected to melting under vacuum, preferably in an electron beam furnace. It is essential that the melting be conducted under a vacuum, which is, of course, normally present in the electron beam furnace. The vacuum should preferably be 0.1 micron or lower. Following the melting operation, the mixture is allowed to solidify and there is obtained beryllium of greatly reduced grain size. The novel material produced by this process has advantages over conventional beryllium in that it can be welded, and even upon remelting and resolidifying it retains its fine grain size and ease of fabricability.

In instances where it is so desired, the aluminum oxide formed by the treatment with aluminum may be removed by submitting the resolidified material to a zone refining process.

Example 1

9000 grams of powdered beryllium was intimately blended with 310 grams of powdered aluminum and 9 grams of boron. The mixture of powders was pressed into a square bar which had a cross-section roughly one inch on each side. The bar was melted in an electron beam furnace at a temperature sufficiently high to cause melting (above about 1300° C.) and at a vacuum of 0.05 micron. Upon resolidification the beryllium obtained was fine grained and possessed great ease of fabricability compared to conventional beryllium. Upon remelting and resolidification, these properties were retained.

In the above example it should be noted that the beryllium powder was found upon analysis to contain 3 percent oxygen. The 310 grams of aluminum employed represents a slight excess over the stoichiometric amount required to form the oxide.

The above experiment was repeated using amounts of aluminum varying with the amount of oxygen found present in the beryllium, and also amounts of boron varying between 0.01 and 0.3 percent by weight of the beryllium. In all cases fine grained fabricable beryllium resulted.

The foregoing examples are given solely for the purpose of illustration and are not to be considered as limitations of the present invention, many variations of which will occur to those skilled in the art without departing from the spirit or scope of the invention.

What is claimed is:

1. A fabricable fine grained beryllium alloy consisting essentially of beryllium with from 0.01 to 0.3 percent by weight boron uniformly incorporated therein.

2. A fabricable fine grained beryllium alloy consisting essentially of beryllium with 0.1 percent by weight boron uniformly incorporated therein.

References Cited in the file of this patent

UNITED STATES PATENTS 2,251,089   Zeppelin _____ July 29, 1941

FOREIGN PATENTS 686,855   France _____ Apr. 22, 1930

OTHER REFERENCES

Kauffman et al.: "Alloys-A, Beryllium Rich Alloys," pp. 565–566.

Beaver: "Cermets and Ceramics," pp. 588–589.

Both articles taken from "The Metal Beryllium" by White, ASM, Cleveland, Ohio, 1955.

Lockheed, Missile and Space Division, "General Research in Materials and Propulsion" vol. 11, Metallurgy and Chemistry, LMSD 288, 140, January 1960, Section 7, pp. 1–2 to 1–3.